(12) United States Patent
Kaliszek et al.

(10) Patent No.: US 6,211,963 B1
(45) Date of Patent: Apr. 3, 2001

(54) LOW DRIFT DEPOLARIZER FOR FIBER OPTIC GYROSCOPE HAVING LEGS WOUND IN A WINDING PATTERN

(75) Inventors: Andrew W. Kaliszek; Bogdan Szafraniec, both of Phoenix; Charles H. Lange; Edward Summers, both of Glendale, all of AZ (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/222,466

(22) Filed: Dec. 29, 1998

(51) Int. Cl.[7] .................................................. G01C 19/72
(52) U.S. Cl. ........................................................ 356/465
(58) Field of Search ..................... 356/350; 250/227.17, 250/227.19, 227.27; 359/497; 385/11, 12

(56) References Cited

U.S. PATENT DOCUMENTS

| | | | |
|---|---|---|---|
| 4,712,306 | * 12/1987 | Cahill et al. | 356/350 |
| 5,074,665 | * 12/1991 | Huang et al. | 356/350 |
| 5,136,667 | 8/1992 | Ohno et al. | 385/11 |
| 5,187,757 | * 2/1993 | Ohno et al. | 356/350 |
| 5,285,257 | 2/1994 | Negishi et al. | 356/350 |
| 5,319,440 | 6/1994 | Kersey et al. | 356/350 |
| 5,335,064 | 8/1994 | Nishiura et al. | 356/350 |
| 5,347,354 | 9/1994 | Müller et al. | 356/350 |
| 5,371,595 | 12/1994 | Nishiura et al. | 356/50 |
| 5,526,115 | 6/1996 | Nishiura | 356/350 |

FOREIGN PATENT DOCUMENTS

| | | |
|---|---|---|
| 0488255A2 | 6/1992 | (EP) . |
| 404344417A | * 12/1992 | (JP) . |

OTHER PUBLICATIONS

Optical Fiber Rotation Sensing, Polarization and Birefringence Effects, Ulrich, pp 68–72, 1994.*

* cited by examiner

Primary Examiner—Samuel A. Turner
(74) Attorney, Agent, or Firm—Kris T. Fredrick (57) ABSTRACT

A design for an environmentally robust fiber depolarizer for a fiber optic gyroscope is disclosed. The design comprises; substantially a clockwise propagating leg and a counter-clockwise propagating leg, distally coupled at opposite ends of a gyroscope sensing coil, said depolarizer fiber leg wound in a that is rotation insensitive pattern and that is also a symmetrical winding pattern. Moreover, axial, radial and embedded sensing coil mounting methods for the fiber depolarizer to reduce the depolarizer sensitivity to thermal variations are also disclosed. Specific attention to the design of the fiber depolarizer of a gyroscope provides enhanced immunity to the stress of environmental variation.

28 Claims, 6 Drawing Sheets

ROTATION INSENSIVE
DEPOLARIZER WINDING
PATTERN

Fig.12

DIPOLE WINDING

LOW DRIFT DEPOLARIZER FOR FIBER OPTIC GYROSCOPE HAVING LEGS WOUND IN A WINDING PATTERN

FIELD OF THE INVENTION

The present invention relates to the field of fiber optic gyroscope designs. More particularly, the present invention relates to the field of fiber optic gyroscope depolarizer designs that mitigate the effects of environmental variations on rotation detection. Even more particularly, the present invention relates to the field of fiber optic gyroscope fiber depolarizer propagation legs that are wound in a rotation insensitive winding pattern to help mitigate the effect of environmental variations on rotation detection. Also, the present invention relates to the field of fiber optic gyroscope fiber depolarizer micro-coil structures that are mounted either axially about or radial to the sensing coil or the sensing coil hub. Moreover, the present invention also relates to fiber depolarizers embedded within the rotation sensing coil.

BACKGROUND

A fiber optic gyroscope measures angular velocity by comparing the phase difference created between light waves propagated clockwise and counterclockwise around a coil composed of fiber optic cable. The light waves originate from a light source that is coupled to the fiber, split, and directed down a clockwise propagating path and a counter-clockwise propagating path. Thereafter, the counter-propagating light waves are recombined and made to impinge upon a photodetector that generates an output signal proportional to the intensity of the combined counterpropagating waves and the phase difference between the counter-propagating waves. The phase difference, and accordingly the angular velocity, is extracted by analyzing the photodetector output signal.

Therefore, for a gyroscope, phase difference is created under two circumstances, when the counterpropagating light waves travel unequal lengths around the fiber cable, and when the cable is rotated about the axis normal to the aperture created by the wound coil. In an ideal gyroscope with symmetrically designed propagating paths, the measurable phase shift between the counter-propagating light waves will directly correspond to the rotation induced phase shift between the counter-propagating waves. Moreover, zero rotation should correspond to zero phase shift between the counter-propagating waves.

Actual gyroscopes are not ideal. Gyroscopes are constructed with non-ideal components that impart errors to the angular velocity measuring capabilities of the gyroscope. Moreover, to affect the most cost-effective fiber gyroscope, it is common to compromise on component choices that can also introduce non-rotation induced phase shift errors into the measuring capabilities of the gyroscope.

Two types of unwanted phase shift errors are traceable to the non-ideal characteristics of gyroscope fiber. Amplitude type phase error and Intensity type phase error are traceable to the mixing of the light wave components from different polarization planes while the light waves traverse the same fiber cable. These phase errors are compounded when single mode type fiber is used to construct the fiber coil of the gyroscope.

Single mode (SM) type fiber is commonly used because it is less expensive than polarization maintaining (PM) type fiber. However, SM fiber is not the optimal fiber choice because SM fiber permits within a fiber cable the concurrent propagation of two or more light waves having the same phase constant in different polarization planes. The inability of the fiber to keep separate the light wave components can lead to both types of phase shift errors. Also, if the polarization planes of the oppositely propagating waves are not aligned when the light waves are recombined, the magnitude of the interference pattern will vary according to the cosine of the acute angle between the oppositely propagating wave polarization planes. Moreover, the high sensitivity of fiber cable to environmental variations such as temperature changes and vibrational stresses augments the problem of multiple polarization planes and unwanted phase shift errors.

Unwanted non-rotation induced phase shift errors can be reduced or eliminated by using a depolarizer in the gyroscope system. By depolarizing the light within a fiber cable, it is more likely that both counterpropagating light waves will encounter the same optical path. A depolarizer will distribute the intensity of each counter propagating light wave into an aggregation of partial lights with polarization planes distributed equally in all directions. Accordingly, the interference pattern developed from ideally depolarized light traversing counter-propagating paths will not vary according to polarization plane differences or misalignment because the interference pattern of the concurrent counter propagating waves will be independent of any respective concurrent counter propagating wave polarization plane.

One type of depolarizer, a Lyot fiber depolarizer comprises coupled segments of PM fiber with the polarization axis of each PM segment aligned at a forty-five degree angle with respect to the polarization axis of the next segment of PM fiber. Additionally, the length of the depolarizer segments should be such that the propagation time of the light polarized along one axis compared to the propagation time of the light polarized along the orthogonal axis is greater than the coherence time of the light propagating therethrough. However, although depolarizers can help to minimize non-rotation induced phase shift errors, depolarizers can also be the source of non-rotation induced phase shift errors. Moreover, environmental variations subjected upon gyroscopes will often augment the problems associated with depolarizers.

In particular, when the design of both propagation paths within a Lyot depolarizer are less than exactly symmetrical, environmental variations can cause unpredictable effects on the depolarizer and ultimately, the measuring capability of the gyroscope. Accordingly, it is desirable to minimize the non-symmetries of gyroscope depolarizers.

To date, the art related to the current invention has not addressed the considerations necessary to design an environmentally robust depolarizer. More particularly, no related art has discussed or suggested the specific design considerations that are suggested by the current inventors to minimize the sensitivity of fiber depolarizers to environmental variations.

For instance, U.S. Pat. No. 5,136,667 issued to Ohno et al., U.S. Pat. No. 5,371,595 issued to Nishiura et al., U.S. Pat. No. 5,347,354, issued to Muller et al., U.S. Pat. No. 5,285,257 issued to Negishi et al., U.S. Pat. No. 5,526,115 issued to Nishiura, and U.S. Pat. No. 5,319,440 issued to Kersey et al., all discuss the use of fiber depolarizer in fiber optic gyroscopes. However, each of these patents merely teaches the use of depolarizers that is ordinary in the art. Moreover, each of these patents specifically does not mention fiber depolarizer design considerations that mitigate the effect of environmental variations.

Finally, U.S. Pat. No. 5,335,064 issued to Nishiura et al (hereinafter "Nishiura") teaches how to make a new type of depolarizer. Nishiura teaches how to make a depolarizer by gluing a polarization maintaining type of fiber segment to the end lead of a polarizer at an angle forty-five degree to the major axis of the polarizer fiber segment. Therefore, Nishiura teaches how to eliminate one segment of PM fiber in making a depolarizer, but does not teach or suggest a need to, or how to, improve the symmetry of a depolarizer, or affect enhanced environmental insensitivity of fiber depolarizers.

SUMMARY OF THE INVENTION

It is an object of the present invention to provide fiber optic gyroscope designs that mitigate the effects of thermal variations and vibrational forces on rotation detection. It is another object of the invention to provide fiber optic gyroscope depolarizer designs that mitigate the effects of thermal variations and vibrational forces on rotation detection. It is yet another object of the invention to provide fiber optic gyroscope single mode fiber depolarizer designs that mitigate thermal variations and vibrational forces on rotation detection.

BRIEF DESCRIPTION OF THE DRAWINGS

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings wherein:

DESCRIPTION OF PREFERRED EMBODIMENTS

Figure 1:
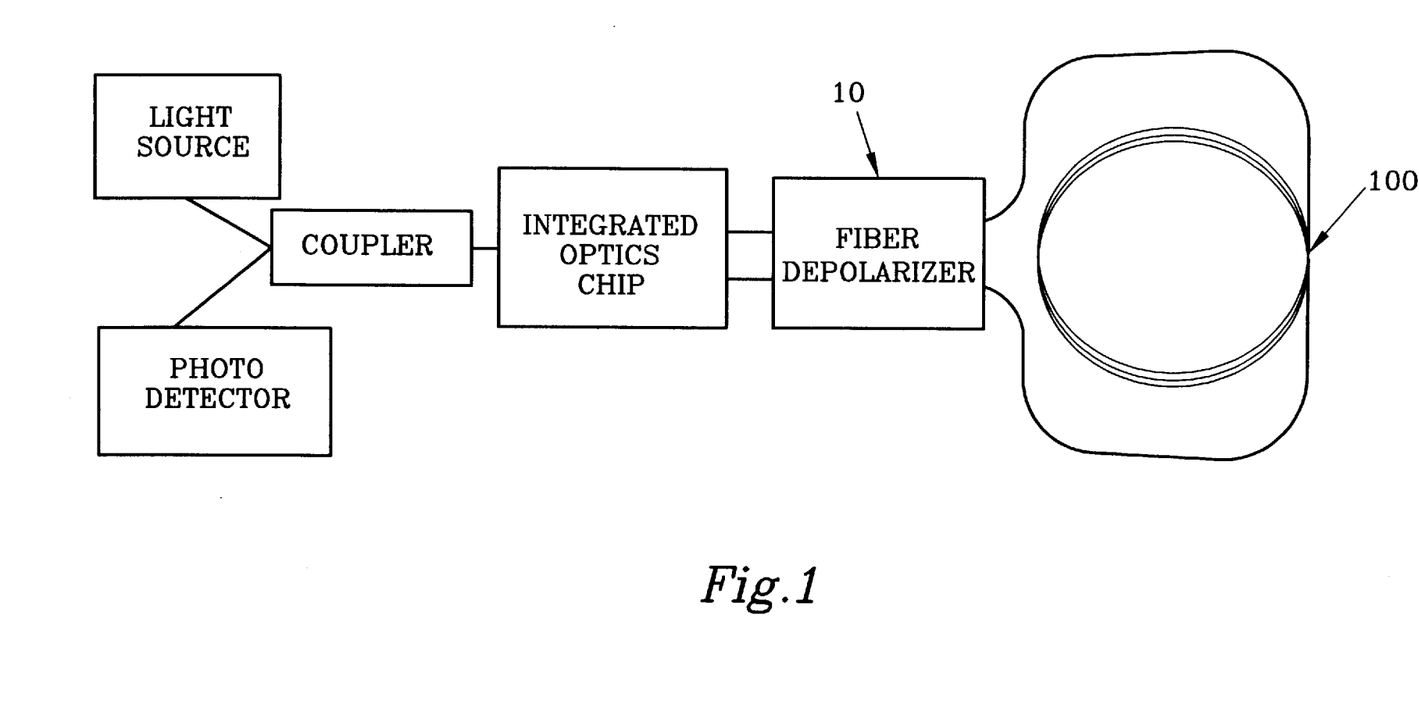
FIG. 1 depicts a block diagram of a fiber gyroscope.

FIG. 1 depicts a fiber optic gyroscope 1. The subject invention is a design and method of making an environmentally robust fiber depolarizer 10 for a fiber optic gyroscope 1. The preferred fiber depolarizer 10 design comprises; substantially equivalent clockwise and counterclockwise fiber legs, 20.1 and 20.2, wound in a symmetrical winding pattern 31 that is also a rotation insensitive depolarizer fiber winding pattern 30, and distally coupled at opposite ends of a gyroscope sensing coil 100, as a free standing micro-coil form 50. Specific attention to the design of these fiber depolarizer 10 components provides enhanced immunity to the stress of environmental variation.

Figure 2:
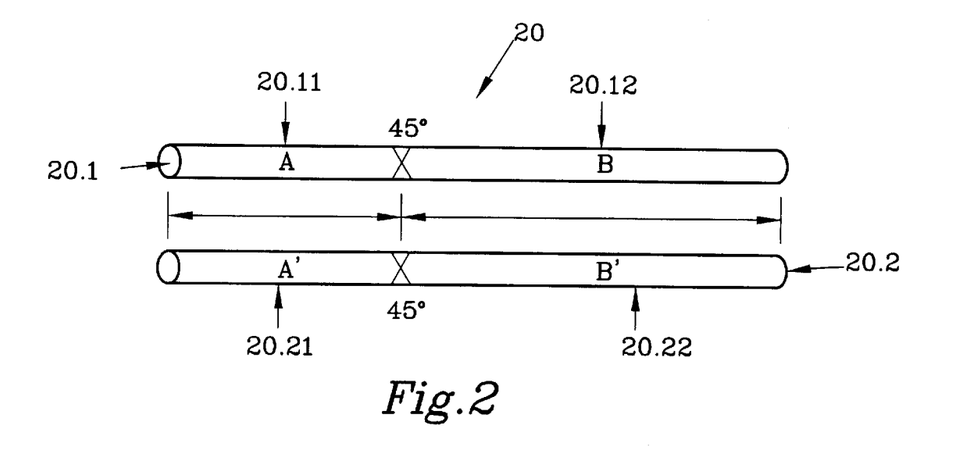
FIG. 2 depicts a fiber Lyot depolarizer with multiple polarization maintaining segments.

To minimize the sensitivity of the fiber depolarizer 10 to environmental variations, the lengths of the counter propagating depolarizer fiber legs, 20.1 and 20.2, are preferably substantially equal in length. Moreover, for symmetry of the fiber depolarizer 10, it is essential that the fiber depolarizer 10 of the current invention comprise at least one fiber depolarizer segment in the clockwise propagation leg 20.1, and at least one depolarizer segment in the counterclockwise propagation leg 20.2. Preferably however, each said propagation leg, 20.1 and 20.2, will have at least two of said depolarizer segments as depicted in FIG. 2.

Another factor contributing to substantially equivalent fiber depolarizer sections 20 is matched fiber designs 22 in the propagating legs, 20.1 and 20.2, of the fiber depolarizer 10. Generally, fiber depolarizers 10 may be made entirely with polarization maintaining (PM) fiber segments or by combining PM and single mode (SM) fiber segments. FIG. 2 depicts two PM segments in the clockwise propagating leg 20.1, A and B, and in the counter clockwise propagating leg 20.2, A' and B'. If the fiber depolarizer 10 is made entirely of PM segments, matched thermal expansion characteristics 26 in the counterpropagating fiber legs, 20.1 and 20.2, may decrease sensitivities to environmental variations. Therefore, in FIG. 2, segments A and B should have the same fiber designs 22 as segments A', and B'. Same fiber designs 22 describes for corresponding segments, substantially the same type of PM fiber, the same fiber coating, and the same length.

Figure 3:
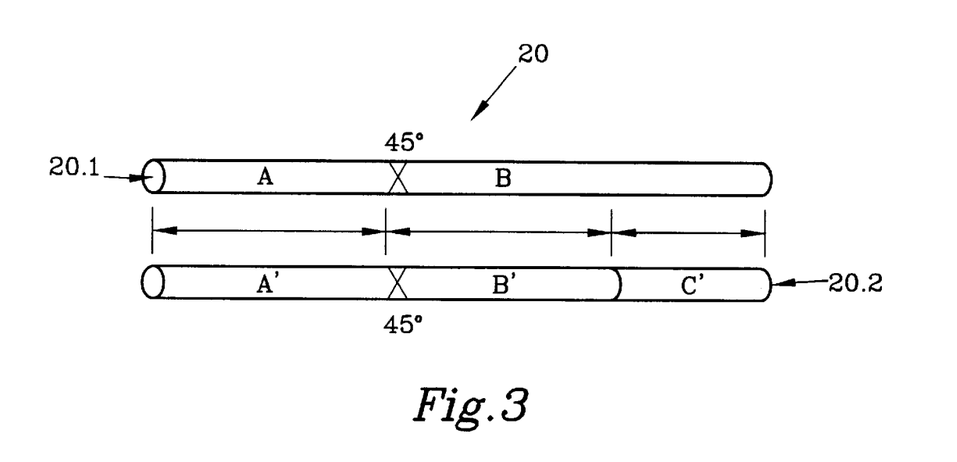
FIG. 3 depicts a fiber Lyot depolarizer with an additional segment of single mode type fiber coupled to one of the fiber depolarizer propagation paths
Figure 4:
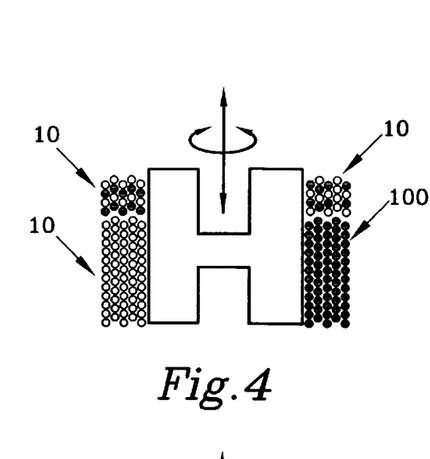
FIG. 4 depicts an axially mounted bifilar wound fiber depolarizer wound in a rotation insensitive winding pattern and bonded directly to the sensing coil of the fiber gyroscope.

On the other hand, fiber depolarizers 10 are also made by combining PM and SM fiber types and utilizing mismatched PM fiber lengths. FIG. 3 depicts a combined fiber depolarizer 10. Ordinarily, in a combined fiber type depolarizer 10, an additional segment of SM fiber is coupled either to one end of the clockwise propagating leg 20.1 or the counter clockwise propagating leg 20.2. For a combined fiber type depolarizer 10, the fiber design 22 for the segments of PM fiber in the clockwise propagating path 20.1, should be the same fiber design 22 for existing corresponding segments of PM fiber in the counterclockwise propagating leg 20.2. Thereafter, the SM fiber that is coupled to one of the legs, 20.1 or 20.2, should have the length necessary to substantially match the lengths of the counterpropagating legs, 20.1 and 20.2. Moreover, the PM fiber and SM fiber should have equivalent fiber coating material(s) 25 to enable symmetrical characteristic response to environmental variation.

In FIG. 3, segments A and B may not individually nor collectively match lengths with segments A' and B', therefore a SM fiber segment C' is added to the counterclockwise propagation leg 20.2 to equalize the lengths of both of said legs, 20.1 and 20.2. In this case, SM segment C' should have the same fiber coating material(s) as the PM fiber segments A, B, A' and B', and be have an individual length such that the length of the clockwise propagating leg 20.1 is substantially equal to the length of the counterclockwise propagating leg 20.2.

Moreover, regardless of whether the fiber depolarizer 10 is comprised entirely of PM segments or a combined fiber type depolarizer 10, it is desirable to balance the thermal expansion properties of the counterpropagating legs, 20.1 and 20.2. Therefore, it is also preferable to bond opposing depolarizer fiber sections 20 with an encapsulant 21 that balances the thermal expansion properties of the depolarizer legs, 20.1 and 20.2. Balancing the thermal expansion properties of the counterpropagating legs, 20.1 and 20.2, minimizes the depolarizer 10 sensitivity to environmental variations when the depolarizer fiber legs, 20.1 and 20.2, are long, or made of dissimilar fibers. Encapsulants 21 that are ordinary in the art to bond fiber coils 100 can also be used to bond the depolarizer fiber legs, 20.1 and 20.2. Moreover, encapsulation can be implemented during stowing of the legs, 20.1 and 20.2, of the depolarizer 10 in the form of a free-standing micro-coil 50.

Another factor in the design of an environmentally robust fiber gyroscope 1 is the mounting method of the fiber depolarizer 10 within the fiber gyroscope 1. Depolarizer mounting methods employed are generally either axial to or radial about the sensing coil 100, a coil hub 55 and an independent carrier 56. More specifically, the depolarizer 10 mounting methods are: as a free standing micro-coil 50 that is bonded axially to the sensing coil 100, as a free standing micro-coil 50 bonded axially to the coil hub 55, as a free standing micro-coil 50 bonded axially to an independent carrier 56, as a free standing micro-coil 50 bonded radially to the sensing coil 100, as a free standing micro-coil 50 radially bonded to the coil hub 55, as a free standing micro-coil 50 bonded radially to an independent carrier 56. Moreover, the fiber depolarizer 10 can also be wound into the last several layers of the sensing coil 100, or imbedded initial layers of the sensing coil 100. FIGS. 4–11 depict the respective mountings disclosed.

Figures 5, 6, 9, 10:
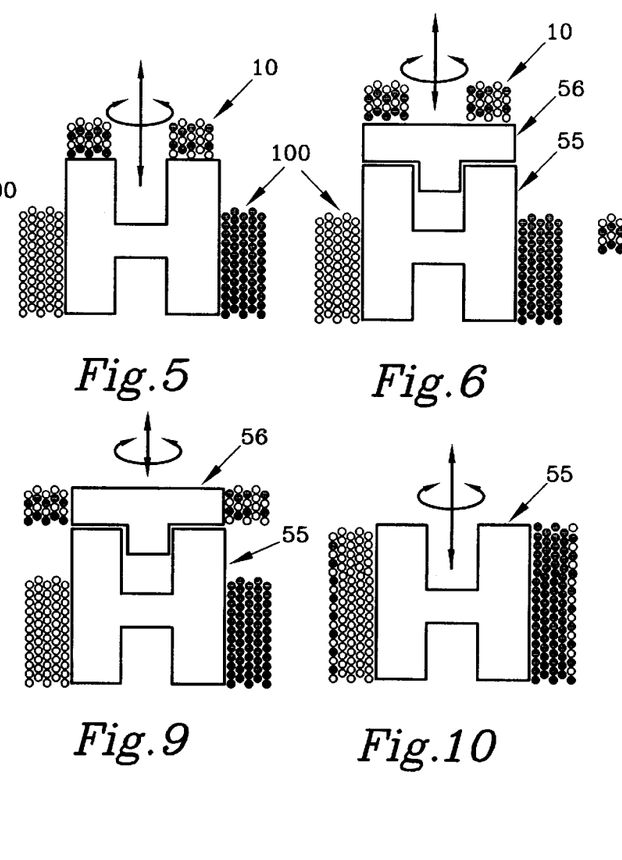
FIG. 5 depicts an axially mounted bifilar wound fiber depolarizer wound in a rotation insensitive winding pattern and bonded directly to the hub upon which the sensing coil of the fiber gyroscope is wound.
FIG. 6 depicts an axially mounted bifilar wound fiber depolarizer wound in a rotation insensitive winding pattern and bonded to an independent carrier and mounted to the hub upon which the sensing coil of the fiber gyroscope is wound.
FIG. 9 depicts a radially mounted bifilar wound fiber depolarizer wound in a rotation insensitive winding pattern and bonded to an independent carrier and mounted to the hub upon which the sensing coil of the fiber gyroscope is wound.
FIG. 10 depicts a bifilar wound fiber depolarizer coupled to the sensing coil of the fiber gyroscope and wound as the last several layers of the sensing coil.
Figure 7:
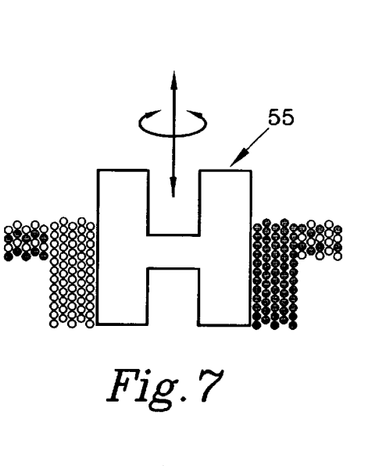
FIG. 7 depicts a radially mounted bifilar wound fiber depolarizer wound in a rotation insensitive winding pattern and bonded directly to the sensing coil of the fiber gyroscope.
Figure 8:
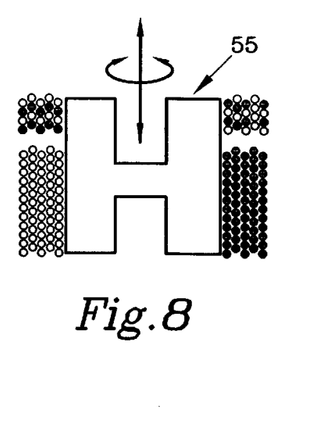
FIG. 8 depicts a radially mounted bifilar wound fiber depolarizer wound in a rotation insensitive winding pattern and bonded directly to the hub upon which the sensing coil of the fiber gyroscope is wound.
Figure 11:
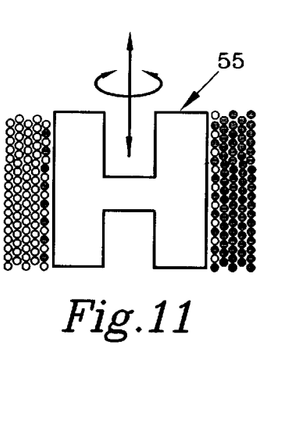
FIG. 11 depicts a bifilar wound fiber depolarizer coupled to the sensing coil of the fiber gyroscope and embedded in the initial layers of the sensing coil.

FIGS. 4–11 show hubs 55 upon which sensing coils 100 are wound in rotation sensitive manner, and upon which the fiber depolarizer 10 is wound in a rotation insensitive winding pattern 32. The particular depolarizer 10 winding pattern used to depict the axial mounting methods is a bifilar winding pattern that is further described below. However, the collection of winding patterns described below can also be used to wind the fiber depolarizer 10. These patterns are rotation insensitive winding patterns 32 that are also a symmetrical winding patterns 31. For control of the encapsulation and thereby increased immunity to environmental variations, the preferred mounting of the current invention couples the fiber depolarizer legs, 20.1 and 20.2, to the gyroscope sensing coil 100 and winds the legs, 20.1 and 20.2, into a radially mounted free standing micro coil bonded to an independent carrier 50.6 as depicted in FIG. 9.

Mechanical misalignment of a depolarizer micro-coil 50, wound in a rotation sensitive manner can be also be a source of static as well as environmentally fluctuating gyro errors. Moreover, the fiber depolarizer 10 is often located in an area of the optical circuit that is particularly susceptible to environmental variations. Therefore, to further reduce the sensitivity to environmental variations, it is desirable to wind the depolarizer fiber legs, 20.1 and 20.2, in a rotation insensitive depolarizer fiber winding pattern 32.

Figure 12:
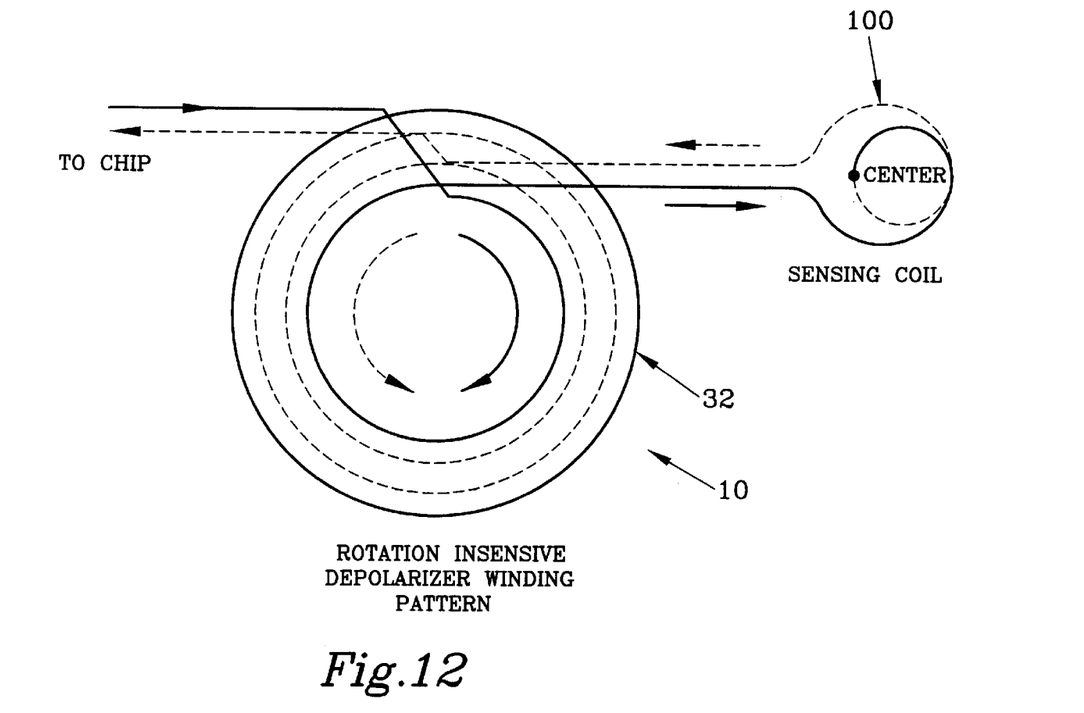
FIG. 12 depicts a rotation insensitive depolarizer fiber winding pattern.

Since the close proximity of opposing depolarizer propagation legs, 20.1 and 20.2, minimizes the environmental gradient between said paths, a rotation insensitive winding pattern 32 is the preferred winding pattern of the depolarizer fiber legs, 20.1 and 20.2. For a rotation insensitive winding pattern 32, the area between the clockwise leg 20.1 and the counterclockwise leg 20.2 of the fiber depolarizer 10 is minimized. A rotation insensitive winding pattern 32 can be achieved by the counterpropagating legs, 20.1 and 20.2, of the depolarizer 10 in the same direction and in contact with each other. In other words, a rotation insensitive winding pattern 32 locates alongside on the fiber depolarizer 10 micro-coil 50, the clockwise leg 20.1 of the fiber depolarizer 10, and the counterclockwise leg 20.2 of the fiber depolarizer 10. FIG. 12 depicts a top-view of the fiber depolarizer 10 micro-coil 50 with the legs, 20.1 and 20.2, wound in a rotation insensitive winding pattern 32.

To further minimize sensitivity to environmental variations, it is also preferable to wind the depolarizer sections 20 in a symmetrical winding pattern 31. A symmetrical winding pattern 31 is a pattern that places the fiber sections of the clockwise path 20.1 and the counterclockwise path 20.2 equidistant from the geometric center of the winding pattern. Many alternate symmetrical winding patterns 31 can be made into rotation insensitive patterns 32. For instance; dipole 31.1, quadrupole 31.2, octupole 31.3, inter-leaved 31.4, and bifilar 31.5, are symmetrical winding patterns 31 that are capable of being wound in a rotation insensitive winding pattern 32. FIGS. 13, 14, 15, 16, and 17 depict symmetrical winding patterns 31 that can also be wound in rotation insensitive winding patterns 32.

Figure 13:
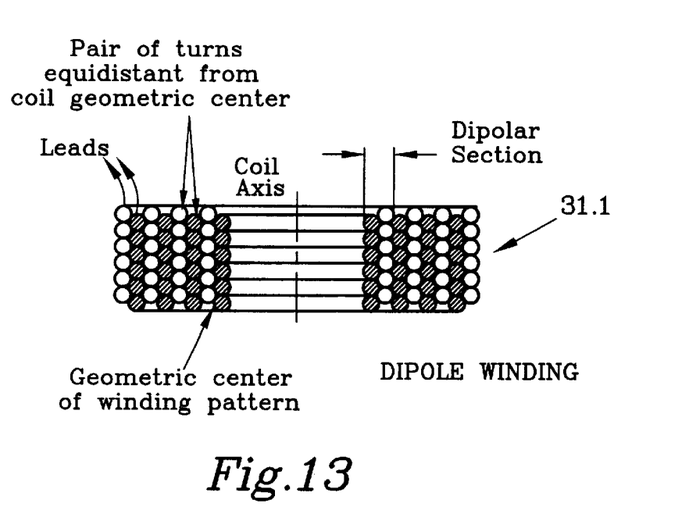
FIG. 13 depicts a dipole winding pattern for a fiber depolarizer.
Figure 14:
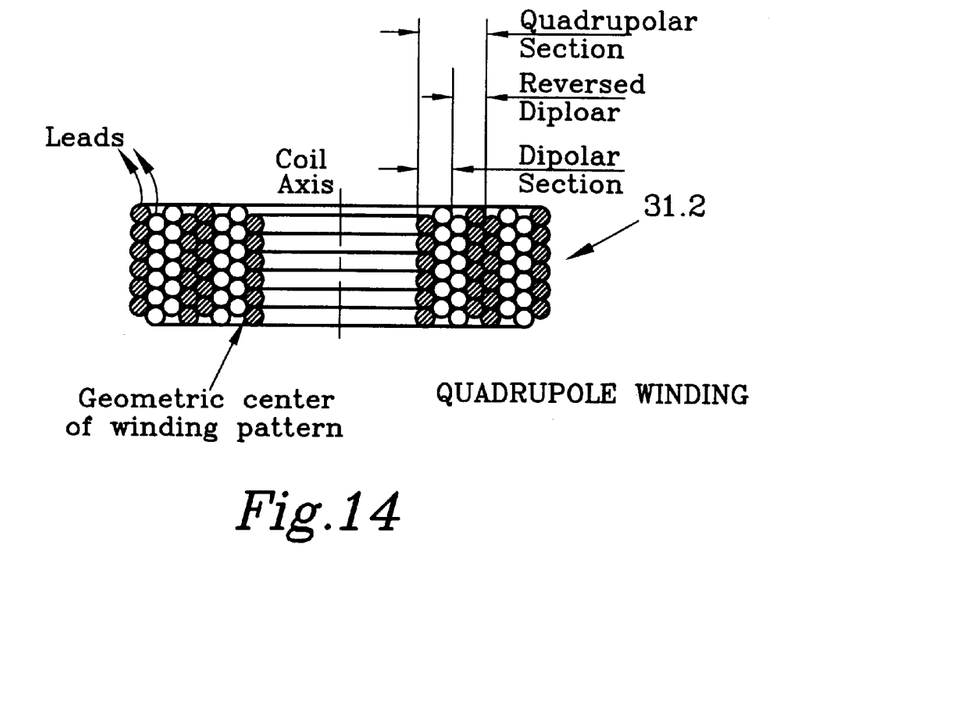
FIG. 14 depicts a quadrupole winding pattern for a fiber depolarizer.
Figure 15:
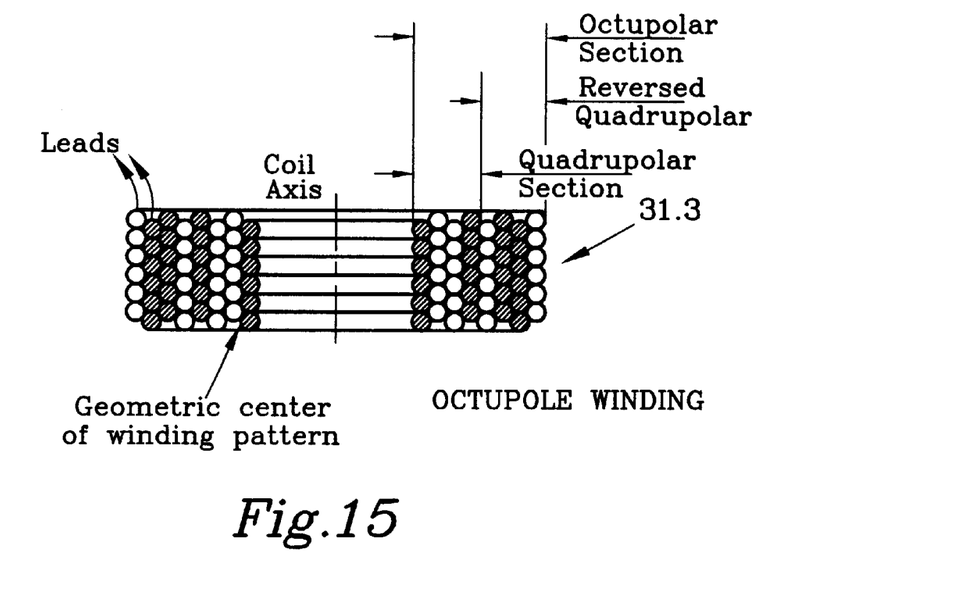
FIG. 15 depicts an octupole winding pattern for a fiber depolarizer.
Figure 16:
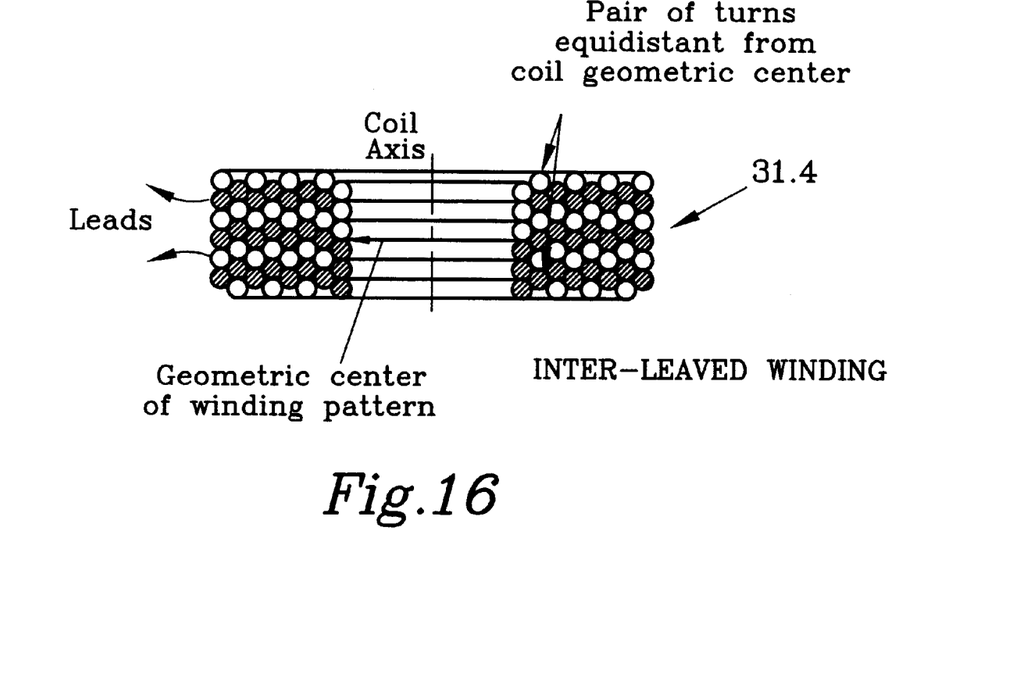
FIG. 16 depicts an interleaved winding pattern for a fiber depolarizer.
Figure 17:
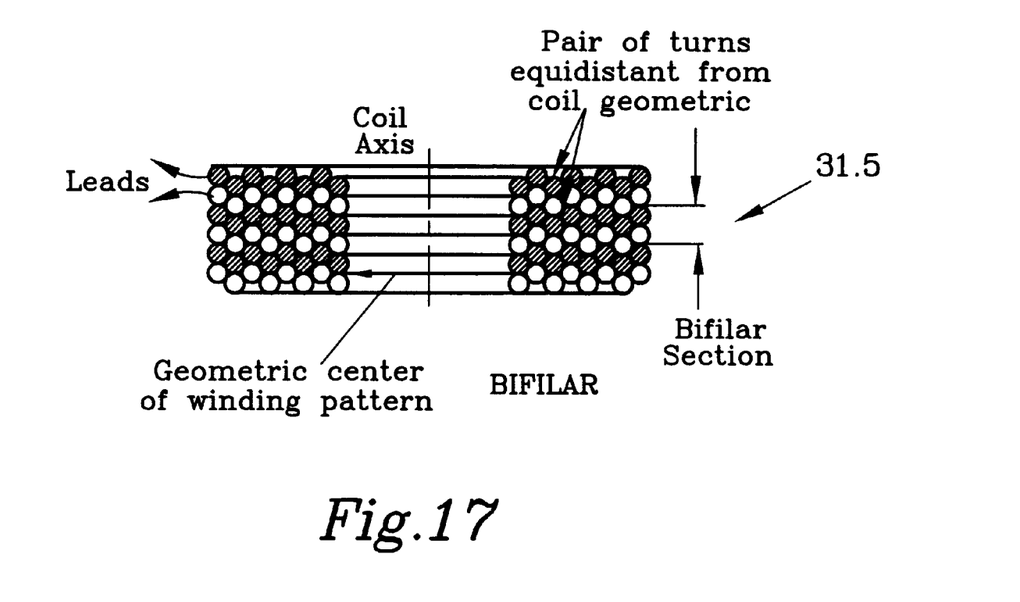
FIG. 17 depicts a bifilar winding pattern for a fiber depolarizer.

The dipole winding pattern 31.1 depicted in FIG. 13 is implemented by alternating the winded layers of the clockwise propagating leg 20.1 and the counterclockwise propagating leg 20.2 throughout the fibers of the micro-coil 50. The quadrupole winding pattern 31.2 of FIG. 14 is implemented by winding a complete layer of the counterclockwise propagating leg 20.2, thereafter winding two complete layers of the clockwise propagating leg 20.1, followed by two complete layers of the counterclockwise propagating leg 20.2, and thereafter repeating said pattern with the remaining fiber of the micro-coil 50. The octupole winding pattern 31.3 of FIG. 15 is implemented by first winding a complete layer of the counterclockwise propagating leg 20.2, followed by two complete layers of the clockwise propagating leg 20.1, followed by a single complete layer of the counterclockwise propagating leg 20.2, followed by a single complete layer of the clockwise propagating leg 20.1, followed by two layers of the counterclockwise propagating leg 20.2 and finally by a layer of the clockwise propagating leg 20.1, and thereafter repeating said pattern with the remaining fiber of the micro-coil 50. The inter-leaved 31.4 winding pattern depicted in FIG. 16 is characterized by first winding a half-layer of the clockwise propagating leg 20.1 and a half-layer of the counterclockwise propagating leg 20.2, and next winding mixed layers of both of said legs, 20.1 and 20.2, and thereafter repeating said pattern with the remaining fiber of the micro-coil 50. FIG. 17 depicts a bifilar winding pattern 31.5. A bifilar pattern 31.5 is characterized by alternating the windings of the clockwise leg 20.1 and the counterclockwise leg 20.2 throughout the fiber of the micro-coil 50. To affect the most immunity to environmental variations, the preferred winding pattern of the fiber depolarizer 10 is an interleaved pattern 31.4, wound in a rotation insensitive pattern 32.

Since the fiber coil 100 of the gyroscope 1 is wound in a rotation sensitive manner, it is necessary to transition into a rotation insensitive pattern 32 after the legs, of the fiber sensing coil 100 have been coupled to the legs, 20.1 and 20.2, of the fiber depolarizer 10. Therefore, it is necessary to redirect either the clockwise propagating leg 20.1 or the counterclockwise propagating leg 20.2 of the fiber depolarizer 10 so that the fibers of both of said legs, 20.1 and 20.2, end up similarly directed. Preferably, the manner of redirecting the fiber from either the clockwise propagating leg 20.1 or the counterclockwise propagating leg 20.2 is to encapsulate one of said fibers into a "U-shaped" form onto the fiber micro-coil structure 50. Thereafter, the fiber of both legs, 20.1 and 20.2, are facing the same direction and the rotation insensitive winding pattern 32 can be implemented.

While these descriptions directly describe the above embodiments, it is understood that those skilled in the art may conceive modifications and/or variations to the specific embodiments shown and described herein. Any such modifications or variations that fall within the purview of this description are intended to be included therein as well. It is understood that the description herein is intended to be illustrative only and is not intended to be limitative. Rather, the scope of the invention described herein is limited only by the claims appended hereto.

What is claimed is:

1. A fiber optic gyroscope comprising a depolarizer and a gyroscope sensing coil, wherein said depolarizer comprises a clockwise propagating leg and a counterclockwise propagating leg, wherein each of said legs comprises a fiber depolarizer segment, wherein each of said legs is wound in a winding pattern and wherein each of said legs is coupled to an end of said gyroscope sensing coil such that said fiber depolarizer is configured to mitigate the effect of environmental variations upon light travelling in said gyroscope sensing coil.

2. The fiber optic gyroscope of claim 1 wherein said clockwise propagating leg and said counterclockwise propagating leg have substantially equivalent fiber coatings and are substantially equivalent lengths.

3. The fiber optic gyroscope of claim 2 wherein said clockwise propagating leg and said counterclockwise propagating leg are together encased within an encapsulant for the length of said legs.

4. The fiber optic gyroscope of claim 1 wherein at least one of said clockwise propagating leg or said counterclockwise propagating leg further comprises at least one single mode fiber segment having a fiber coating that is substantially thermally equivalent to polarization maintaining fiber segments of said clockwise propagating leg and said counterclockwise propagating leg.

5. The fiber optic gyroscope of claim 4 wherein said clockwise propagating leg said counterclockwise propagating leg are together encased within an encapsulant for the length of said legs.

6. The fiber optic gyroscope of claim 1 wherein said winding pattern is a symmetrical winding pattern.

7. The fiber optic gyroscope of claim 6 wherein said symmetrical winding pattern is selected from the group consisting of dipole winding pattern, quadrupole winding pattern, octupole winding pattern, interleaved winding pattern, and bifilar winding pattern.

8. A fiber depolarizer comprising;
   a. a clockwise propagating leg comprising a fiber depolarizer segment, wherein said clockwise propagating leg is coupled to a first end of a gyroscope sensing coil; and
   b. a counterclockwise propagating leg comprising a second fiber depolarizer segment, wherein said counterclockwise propagating leg is coupled to a second end of said gyroscope sensing coil;
      wherein said clockwise propagating leg and said counterclockwise propagating leg are wound in a winding pattern to form a micro-coil structure;
      such that said fiber depolarizer mitigates the effect of environmental variations.

9. The fiber depolarizer of claim 8 wherein said clockwise propagating leg and said counterclockwise propagating leg have substantially equivalent fiber coatings and are substantially equivalent lengths.

10. The fiber depolarizer of claim 8 wherein said clockwise propagating leg and said counterclockwise propagating leg are together encased within an encapsulant for the length of said legs.

11. The fiber depolarizer of claim 8 wherein at least one of said clockwise propagating leg or said counterclockwise propagating leg further comprises at least one single mode fiber segment having a fiber coating that is substantially thermally equivalent to polarization maintaining fiber segments of said clockwise propagating leg and said counterclockwise propagating leg.

12. The fiber depolarizer of claim 11 wherein said clockwise propagating leg and said counterclockwise propagating leg are together encased within an encapsulant for the length of said legs.

13. The gyroscope of claim 8 wherein said rotation insensitive winding pattern is also a symmetrical winding pattern.

14. The fiber depolarizer of claim 13 wherein said symmetrical winding pattern is selected from the group of symmetrical winding patterns consisting of dipole winding pattern quadrupole winding pattern, octupole winding pattern, interleaved winding pattern, and bifilar winding pattern.

15. The fiber depolarizer of claim 8 wherein said micro-coil structure is a free standing micro-coil that is bonded to the sensing coil.

16. The fiber depolarizer of claim 8 wherein said micro-coil structure is a free standing micro-coil bonded to a coil hub.

17. The fiber depolarizer of claim 8 wherein said micro-coil structure is a free standing micro-coil bonded to an independent carrier.

18. The fiber depolarizer of claim 8 wherein said micro-coil structure is mounted radially to the rotation sensing axis of the gyroscope sensing coil.

19. The fiber depolarizer of claim 8 wherein said micro-coil structure is mounted axially to the rotation sensing axis of the gyroscope sensing coil.

20. A method of making a fiber optic depolarizer, the method comprising the steps of:

forming a first fiber depolarizer segment;

forming a second fiber depolarizer segment;

coupling said first and second depolarizer segments to first and second ends of a sensing coil, respectively;

winding said first and second depolarizer segments in a winding pattern to form a micro-coil structure such that environmental effects upon light passing through said micro-coil structure are reduced.

21. The method of claim 20 wherein said winding pattern is a rotation insensitive winding pattern.

22. The method of claim 20 wherein said winding pattern is a rotation sensitive winding pattern.

23. The method of claim 20 further comprising the step of mounting said micro-coil structure with said sensing coil.

24. The method of claim 23 wherein said micro-coil structure and said sensing coil are mounted with a hub.

25. The method of claim 23 wherein said micro-coil structure is mounted to a carrier and said sensing coil is mounted to a hub.

26. The method of claim 25 wherein said micro-coil structure is mounted radially from the rotation axis of said sensing coil.

27. The method of claim 21 wherein said micro-coil structure is mounted to a carrier and said sensing coil is mounted to a hub.

28. The method of claim 27 wherein said micro-coil structure is mounted radially from the rotation axis of said sensing coil.

* * * * *